United States Patent Office 3,542,509
Patented Nov. 24, 1970

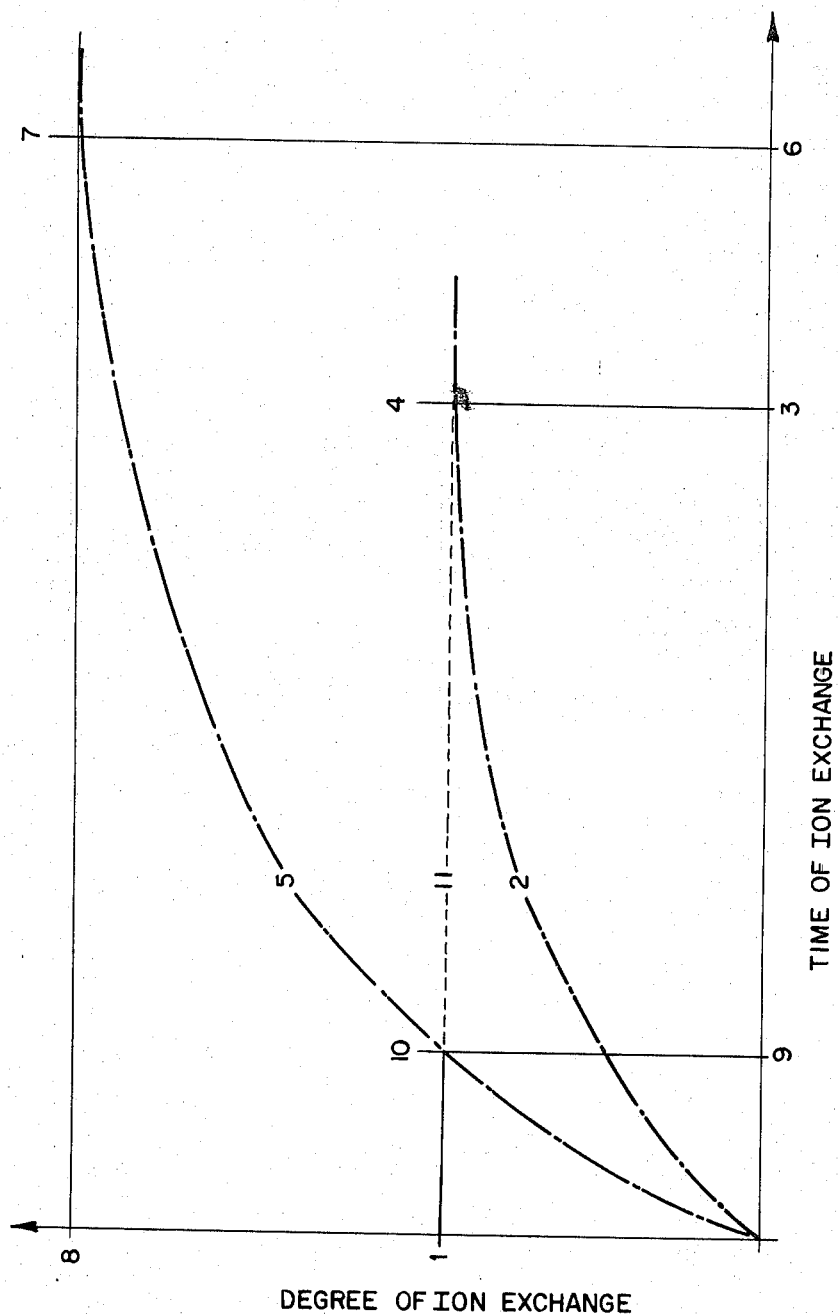

3,542,509
PROCESS FOR CHARGING OF ION-EXCHANGERS
Helmut Fürtig, Jessnitz, Friedrich Wolf, Leipzig, Manfred Weber, Wolfen, Udo Hädicke, Dessau-Haideburg, and Herbert Knoll, Dessau, Germany, assignors to VEB Farbenfabrik, Wolfen, Germany
Filed Feb. 27, 1968, Ser. No. 708,697
Int. Cl. C01b *33/28;* B01j *11/40*
U.S. Cl. 23—112
4 Claims

ABSTRACT OF THE DISCLOSURE

A process for the charging of ion exchangers with certain ions in a definite amount by ion exchange in liquid media, which comprises contacting said ion exchanger with a solution containing the ions to be introduced into the exchanger, the supply of such ions in said solution being larger than that which is necessary for reaching the desired degree of charging in accordance with the known equilibrium method, and interrupting the charging operation when the desired degree of charging is reached, by suddenly supplying to the exchange solution ions of the same type which are given off by the exchanger.

---

The present invention relates to a process for the charging of ion-exchangers with certain ions in determined amount. We intend to include by ion-exchangers all hitherto known natural or synthetic materials which are capable of exchanging ions contained in their structure for other ions.

The known ion-exchangers are of a great variety, as far as structure and chemical composition are concerned. They may be native materials, e.g., clays and zeolites; or they may be made synthetically, such as synthetic resin exchangers, molecular sieves, or liquid ion-exchangers. The ions to be exchanged may be anions or cations. The preparation as well as the application of such ion-exchangers are known and they are widely used.

For a certain number of uses of ion-exchanging materials it is necessary that they contain a definite amount of given ions, which they exchange when used or which, without being exchanged, play a specific role during use. Thus it is, for example, necessary that molecular sieves which contain sodium as originally exchangeable ions in their crystal structure, be charged with a certain amount of nickel ions when used as catalysts in cracking processes, so that they will be capable of being fully effective as catalysts. Such molecular sieves therefore contain nickel ions in addition to the originally present sodium ions.

Another example is ion-exchangers of the synthetic resin type, for instance polystyrene crosslinked with divinylbenzene, which originally are present in the sodium form; these, too, need for use as catalysts a definite amount of catalytically active metal ions substituting a portion of the original sodium ions.

It is, therefore, necessary to charge the materials capable of functioning for ion-exchange with a definite amount of active ions needed for any specific purpose. Since the possibilities of use of ion-exchanging materials are widely known, it appears unnecessary to list the cases where they can be used or to name any more than the above mentioned examples.

According to methods known and used up to now, the charging of ion-exchanging materials with other ions required for a specific purpose is done in an equilibrium reaction and the time when the equilibrium is reached is observed. Two methods are useful for that end. In the first method, the exchange material containing the original ions is introduced into a substantially aqueous solution which contain those ions that are to be exchanged for the original ions. In the second method, the exchanger containing the original exchangeable ions, is arranged in a solid layer and a solution, which is substantially an aqueous one, and which contains the ions to replace the original ones, is passed through the exchange material. The content of the exchange solution in exchangeable ions is computed in each case in advance, and the ion-exchanger is then brought into contact with a solution having the calculated concentration.

After the equilibrium has been reached, the exchanger, now containing the desired amount of exchanged ions, is (in the first method) separated from the solution, and washed with water; in the second method, the solution is displaced by water from the solid exchanger layer.

In general, the ions to be introduced into the exchanger are present in the form of salt solutions, but in some cases solutions of acids or alkalies are used; or the ions to be exchanged are linked to a second ion-exchanger, from which they are given off to the exchanger to be charged.

The computation of concentrations for the solutions to be used for exchange of ions in the equilibrium processes is well known so that it is unnecessary to explain it here. The conventional method of charging an ion-exchanger with certain ions in definite amount while waiting for the equilibrium to be reached, results in an even distribution of the introduced ions in the skeleton of the exchanger. The method has, however, the disadvantage that the adjustment of the equilibrium takes a comparatively long time because the rate of exchange drops with increasing charge of the exchanger.

It is therefore an object of the present invention to provide a process of charging ion-exchangers with certain ions in which a desired number of ions is exchanged in comparatively short time and which still makes it possible to obtain an even distribution of the exchanged ions in the exchanger material.

Others objects and advantages of the invention will become apparent from the following detailed description.

According to the invention, charging of ion-exchangers with certain ions in a definite amount is brought about by ion-exchange in liquid medium in such a manner that the exchanger is contacted with a solution containing the ions to be introduced, in which the supply of such ions is larger than the quantity required to reach the desired degree of charging according to the equilibrium method. When the desired degree of charge is reached, further charging is interrupted by adding to the exchange solution suddenly the type of ions which are given off from the exchanger. The addition of these ions which are given off from the exchanger is effected in such an amount that the immediate adjustment of the exchange equilibrium is obtained.

It is advantageous to carry out the process according to the invention in a stirring vessel which is also provided with means for temperature control. By applying the method of the invention, the exchange is immediately interrupted with absolute certainty and the charging of the ion exchanger is achieved in a reproducible manner. The separation of the ion exchanger from the exchange solution can be timed as desired. The time necessary for reaching the charge of an ion-exchanger with certain ions in determined amount will be shortened to a considerable degree as compared to the known operation which requires waiting for the exchange equilibrium.

It is no problem to calculate the quantity of ions which has to be added to the exchange solution for interrupting the exchange operation. The computation is done in the manner known for existing exchange processes while considering the amount of ions already exchanged at time of interruption. The kinetics of ion exchange in solutions is likewise sufficiently known so that the proper moment for interrupting the exchange according to the invention can easily be found for any given ion supply.

The process according to the invention can be used in connection with all ion-exchangers, inorganic or organic, native or synthetic, of which we name by example crystalline zeolites, clay minerals, synthetic resin exchangers, liquid ion-exchangers, gel zeolites, porous glasses, silicone exchangers, and carbon exchangers. The process can be carried out at any desired temperature, provided the ion-exchangers are stable thereat, and at any desired pressure above the solid point of the liquid ion exchange medium, and for any exchangeable kinds of ions.

The process can also be carried out in case more than two ions are simultaneously involved in the ion exchange, and it is immaterial whether the exchange solution or other ion-exchangers serve as carriers for the ions to be introduced into the exchanger; the chemical bond of the ions to be introduced does not play any part in this. The process is further well suited for subsequent adjustment of a desired degree of charge of ion-exchangers which have previously been charged. For instance, a molecular sieve of the type A, which contains 60% magnesium ions in addition to the remaining sodium ions, may be adjusted to a 40% magnesium content.

Although the expressions used in the description of this invention are known to the expert in this field, they will be explained in the following for better understanding.

The "ion exchange degree" or "degree of charge" of an ion-exchanger is indicated in percent (percent of ion exchange). It is defined by the ratio of gram equivalents of ions introduced into the ion-exchanger during the exchange to the sum of gram equivalents of all exchangeable ions contained in the exchanger after the exchange, multiplied by 100.

The "supply of ions" is defined by the ratio of gram equivalents of ions present in solution to be introduced into the exchanger to the sum of gram equivalents of all exchangeable ions present in the original or untreated ion-changer.

One way of shortening the time necessary for charging the exchange material with certain ions in a desired degree, would be to contact the exchanger with an exchange solution containing a larger amount of ions than is necessary according to the known process and to separate the exchanger from the exchange solution at the moment when the desired exchange is reached. That method would, however only be possible on a small scale such as for laboratory use. Not even then could a satisfactory degree of exchange be achieved since the exchange reaction continues during the separation stage; thus, in the final result a larger quantity of ions would be exchanged, since it is not possible to remove the exchange solution from the pores of the exchanger with the necessary speed. On an industrial scale this method would not be useful because a definite degree of exchange could not be guaranteed due to the long time needed for the separation of the large quantities of exchanger to be separated. Moreover, there would be no even distribution of the ions introduced in the skeleton of the exchanger.

The process according to the invention will now be explained with reference to the accompany diagram in which the ion exchange time is plotted on the abscissa and the degree of ion exchange on the ordinate.

A cation exchanger containing sodium ions as exchange ions is to be charged with calcium ions to a degree designated by 1. When a certain supply of Ca-ions is present, the exchange of ions occurs as shown by curve 2. After the time indicated at 3 has lapsed, the equilibrium of exchange has been reached as indicated at 4; the degree 1 is obtained. This course corresponds to the known process.

In the process according to the invention, a larger amount of calcium ions is supplied to the cation exchanger; the exchange follows curve 5 and after a lapse of time indicated at 6 the degree of charge would have reached point 8 on curve 7. For reaching the desired degree of charge 1, however, only a time 9 is required. After this time when point 10 is reached on curve 5, so many sodium ions are added suddenly to the reaction solution that an equilibrium is obtained illustrated by the horizontal line 11. The degree of ion exchange in the exchanger shown at 1 can no longer be altered.

Further work-up is done as usual by separating the ion-exchanger from the exchange solution, washing with pure water free of ions, and finally drying.

The invention will now be further illustrated by a number of examples, which are given by way of illustration and not of limitation. It should be understood that many changes in the details can be made without departing from the spirit of the invention.

EXAMPLE 1

A molecular sieve of type Na–4A is to be charged with Mg ions to a degree of charge of 32.6%. 232.5 g. of a 19.05% by weight water containing molecular sieve of type Na–4A, the dried zeolite powder of which having a composition of 41.1% by weight $SiO_2$, 37.5% by weight $Al_2O_3$, and 21.5% by weight $NaO_2$, are introduced while stirring into 595 ml. of an aqueous solution which contains 68 g. $MgCl_2.6H_2O$. Stirring is continued for 6 hours at room temperature. After exactly 6 hours, 100 ml. of an aqueous solution of 10 g. NaCl are introduced into the exchange solution, whereby the ion exchange (between Na ions and Mg ions) is interrupted. The charged exchanger is separated from the solution, rinsed with water, and dried. The analysis of the molecular sieve, which now corresponds to the type Na–Mg–5A, shows a content of Mg-ions of 32.6%.

When the desired charge is carried out by the known equilibrium method, the same quantity of the above mentioned exchanger has to be introduced into 826 ml. of an aqueous solution of 60.5 g. $MgCl_2.6H_2O$ and has to remain for 30 hours in contact with the exchange solution. The analysis shows a charging with 32.7% Mg ions.

For completing the comparison we have to report that upon working with the equilibrium method, with the above mentioned higher ion supply, after 30 hours a molecular sieve is obtained which contains 37.5% Mg ions.

EXAMPLE 2

A molecular sieve of type Na–4A is to be charged with Co ions to a degree of charge of 50%.

19.5 g. of the molecular sieve, composed as follows, 0.922 $Na_2O \cdot Al_2O_3 \cdot 1.888$ $SiO_2$ and 23% by weight $H_2O$, are introduced at room temperature into 1 liter of a 0.1013 N aqueous solution of cobalt chloride. After 40 minutes, 250 ml. of an aqueous solution of 57 g. NaCl are made to flow into the exchange solution. Analysis of the dried molecular sieve, which now corresponds to type Na–Co–5A, shows a charge of 50.2% Co ions.

If one were to work according to the known equilibrium method, and wanted to obtain the same charge, 37.2 g. of a molecular sieve type Na–4A would have to be treated with 1 liter of a $CoCl_2$ solution of the same strength for four days in order to obtain a charge of 50.2% cobalt ions in the molecular sieve.

EXAMPLE 3

A molecular sieve of type Na–4A is to be charged with Mg ions to a degree of charge of 37%. The composition of the sieve is 0.922 $Na_2O \cdot Al_2O_3 \cdot 1.888$ $SiO_2$ and 20% by weight $H_2O$.

50 g. of the molecular sieve are treated with 5.6 liter of a 0.095 N aqueous solution of magnesium chloride at 20° C. with vigorous stirring. After one hour, 150 ml. of an aqueous solution containing 95.2 g. sodium nitrate are passed into the exchange solution. After filtration, washing and drying, the molecular sieve, which now corresponds to the type Na–Mg–5A, contains 37.03% Mg-ions.

When working with the known equilibrium methods, 50 g. of the molecular sieve of the type Na–4A would have to be treated with 1.405 liters of an aqueous solution of $MgCl_2$ of the same strength for 30 hours at 20° C. to obtain a charging degree of 37.15% magnesium ions.

If with the first method starting materials work is continued without interruption by sodium nitrate until ion exchange equilibrium is reached, a molecular sieve of the type Na–Mg–5A is obtained after 30 hours which contains 53.6% magnesium ions.

The foregoing disclosure relates only to preferred embodiments of the invention which is intended to include all changes and modifications of the examples described within the scope of the invention as set forth in the appended claims.

What is claimed is:

1. A process for the charging crystalline zeolite molecular sieves with certain ions in a definite amount by ion exchange in liquid media, which comprises contacting said crystalline zeolite molecular sieve with a solution containing the ions to be introduced into said molecular sieve, the supply of such ions in said solution being larger than that which is necessary for reaching the desired degree of charging in accordance with the equilibrium method, and interrupting the charging operation when the desired degree of charging is reached, by suddenly applying to the exchange solution ions of the same type which are given off by said molecular sieve.

2. The process according to claim 1, which comprises adding to the exchange solution ions of the type given off by said molecular sieve in such an amount that the immediate adjustment to the exchange equilibrium occurs, whereby further exchange of ion is interrupted.

3. The process according to claim 2, which comprises performing the exchange under stirring.

4. The process according to claim 2, which comprises performing the exchange in a vessel provided with temperature control means.

References Cited
UNITED STATES PATENTS

| | | | |
|---|---|---|---|
| 2,908,549 | 10/1959 | Estes | 23—112 |
| 2,962,355 | 11/1960 | Breck el al. | 252—455 X |
| 3,014,078 | 12/1961 | Fleck et al. | 252—455 X |
| 3,098,032 | 7/1963 | Gladron et al. | 252—455 X |
| 3,382,039 | 5/1968 | Calmon et al. | 23—112 |

DANIEL E. WYMAN, Primary Examiner

C. F. DEES, Assistant Examiner

U.S. Cl. X.R.

252—455